United States Patent [19]

Baizer et al.

[11] 4,246,388

[45] Jan. 20, 1981

[54] INITIATION OF ANIONIC POLYMERIZATION OF VINYL MONOMERS BY REDUCED GRAPHITE

[75] Inventors: Manuel M. Baizer; Thomas E. Rogers, both of Santa Monica, Calif.

[73] Assignee: Monsanto Company, St. Louis, Mo.

[21] Appl. No.: 97,071

[22] Filed: Nov. 23, 1979

[51] Int. Cl.$^3$ ............................................. C08F 4/00
[52] U.S. Cl. ................................... 526/217; 526/316; 526/328; 526/329.7; 526/341; 526/346
[58] Field of Search ........................................ 526/217

[56] References Cited

U.S. PATENT DOCUMENTS

| | | | |
|---|---|---|---|
| 3,032,542 | 5/1962 | Goode | 526/217 |
| 4,130,703 | 12/1978 | Rashkov et al. | 526/173 |

FOREIGN PATENT DOCUMENTS 2366221  4/1978  France .

OTHER PUBLICATIONS

G. Merle et al., J. Poly. Sci. Poly. Chem., 15, pp. 2067-2074 (1977).

J. Simonet and H. Lund, J. Electroanal. Chem., 75, pp. 719-730 (1977).

J. O. Besenhard, Carbon, 14, pp. 111-115 (1976).

*Primary Examiner*—Harry Wong, Jr.
*Attorney, Agent, or Firm*—L. Bruce Stevens

[57] ABSTRACT

The invention is a process for anionically polymerizing vinyl monomers comprising contacting a vinyl monomer with an electrolytically reduced graphite having formed therein a Graphite R$_4$N$^+$ intercalation compound wherein Graphite is a graphite anion radical and each R is alkyl, preferably alkyl having not more than 8 carbon atoms, to form vinyl polymer. The reduced graphite for polymerizing the vinyl monomers is prepared by electrochemical reduction of a graphite cathode in a polar aprotic solvent containing a quaternary ammonium salt electrolyte to form a graphite anion associated with a quaternary ammonium cation intercalated in the graphite. When the electrolysis is completed the graphite cathode is removed from the electrolysis cell, rinsed and contacted with vinyl monomer either dissolved in a solvent or neat to cause the polymer formation.

6 Claims, No Drawings

INITIATION OF ANIONIC POLYMERIZATION OF VINYL MONOMERS BY REDUCED GRAPHITE

BACKGROUND OF THE INVENTION

This invention relates to a process for anionically polymerizing vinyl monomers.

It is known that alkali metals form compounds with graphite and that these intercalation compounds can be used to polymerize vinyl monomers. (G. Merle, J. P. Pascault, Q. T. Pham, C. Pillot, R. Salle, J. Golé, I. Rashkov, I. Panayotov, D. Guerard and A. Hérold, *J. Poly. Sci. Poly. Chem.*, 15, pp 2067–2074 (1977)).

Also graphite has been electrochemically reduced by Simonet and Lund and independently by Besenhard. They independently prepared reduced graphite by electrolytically reducing graphite in a polar aprotic solvent containing an electrolyte, thus, preparing the graphite anion with a quaternary ammonium cation or alkali metal cation associated with the anion and intercalated in the graphite. Simonet and Lund demonstrated that this reduced graphite containing graphite anion radical quaternary ammonium cation could function as an electron-transfer agent by showing that fluorenone could be reduced with anion radical. (J. Simonet and H. Lund, *J. Electroanal. Chem.*, 75, pp. 719–730 (1977) and J. O. Besenhard, *Carbon*, 14 pp. 111–115 (1976)).

Normally in electrolytic polymerization processes it is necessary to reduce a monomer in the presence of electrolyte salt and solvent, and then a tedious and costly work-up is involved in freeing the polymer from both the electrolyte salt and solvent; whereas, the process of the invention permits preparation of polymer free of electrolyte salt and, in some cases, even free of solvent.

The prior art process described herein on page 1, lines 6–9, produces anionic intermediates with alkali metal counterions; whereas, the process of this invention provides $R_4N^+$ counterions which have not previously been achieved with non-electrochemical means. The reactivity iof $M^+R^-$ polymer backbone $R^-M^+$ where M is alkali metal is different from that of $R_4N^+R^-$ polymer backbone $R^-R_4N^+$ both with respect to rates of reaction and possibly even stereochemistry. Furthermore, whereas electron-transfer from Graphite$^-M^+$ to a vinyl monomer occurs readily if the vinyl monomer has not a very negative reduction potential; the electron-transfer from Graphite$^-R_4N^+$ can occur even to a monomer of very negative reduction potential.

Also, anionic block copolymers can be formed by the process of the invention using a mixture of two or more different monomer, such as styrene and butadiene or styrene and ethylene oxide; alternatively, the second monomer will not be initially present but is added after the first monomer has been polymerized. More details with regard to other suitable monomer combinations and block copolymerization and found in chapter 3, *Block Copolymers*, W. H. Janes and D. C, Allport, eds., J. Wiley and Sons, 1973.

SUMMARY OF THE INVENTION

The invention is a process for anionically polymerizing vinyl monomers comprising contacting a vinyl monomer with an electrolytically reduced graphite having formed thereon a Graphite$^-R_4N^+$ intercalation compound wherein Graphite is a graphite anion radical and each R is alkyl, preferably alkyl having not more than 8 carbon atoms, to form vinyl polymer. The reduced graphite for polymerizing the vinyl monomers is prepared by electrochemical reduction of a graphite cathode in a polar aprotic solvent containing a quaternary ammonium salt electrolyte to form a graphite anion associated with a quaternary ammonium cation intercalated in the graphite. When the electrolysis is completed the graphite cathode is removed from the electrolysis cell, rinsed and contacted with vinyl monomer either dissolved in a solvent or neat to cause the polymer formation.

In the process of this invention, it has been shown that graphite as a cathode (specifically "Grafoil GTA" made by Union Carbide, although all graphites will show similar characteristics, including graphite fibers) can be reduced in a polar aprotic solvent containing $R_4N^+X^-$ electrolyte where R=alkyl and $X^-=ClO_4^-$, $BF_4^-$, $PF_6^-$, $Cl^-$, $Br^-$, $I^-$, $F^-$ or the like, between $-1.1$ to $-3.0$ volts versus a Ag/Ag I reference electrode to form reduced graphite (graphite anion radical), and this reduced graphite electrode can be removed from the electrolytic cell, rinsed and contacted with vinyl monomers either in solution or neat to initiate polymerization of the vinyl monomer forming polymer. By this process, methyl vinyl ketone, ethyl acrylate, acrylonitrile, methyl methacrylate and styrene have been polymerized.

The reduction of the graphite can be either by constant voltage or by constant current. Constant current electrolysis having current densities from 1 mA. (millampere)/sq. cm. to 50 mA./sq. cm. have produced reduced graphites which were used to initiate vinyl polymerization. A divided or an undivided cell can be used to produce the reduce graphite, typically, the reduction and polymerization initiation is carried out at room temperature although appreciably higher or lower temperatures can be used. Furthermore, the graphite can be repeatedly electrolytically reduced and be reused to cause vinyl monomer polymerization.

Specifically, twenty (20) discs of 1 cm. diameter by 0.038 cm. thick made from "Grafoil GTA" graphite were suspended on a copper wire. Exposed copper not in contact with the graphite discs was insulated by coating with a room-temperature vulcanizing (RTV) rubber. Due to the sometimes severe exfoliation of the graphite during reduction, the stack was placed inside a $\frac{1}{2}"$ (I.D.)×3" long Teflon tube. The Teflon tube had been made porous by cutting $\frac{1}{8}"$ to $\frac{1}{4}"$ wide slits lengthwise through the tube. An alternative design has the slits in the Teflon tube covered by 149μ mesh Teflon net that was used in cases of most severe exfoliation.

Typically, a 0.1 molar solution of electrolyte, $(CH_3)_4N^+ClO_4^-$ or $(C_2H_5)_4N^+ClO_4^-$, in dry dimethylformamide (DMF) was used as the solvent-electrolyte system. A platinum anode was employed with an Ag/Ag I (0.001 molar) reference electrode.

The catholyte was deoxygenated with either argon or nitrogen before the current was passed and a blanket of the gas was passed through the cell during reduction. The procedure used to prepare the reduced graphite (for polymerizing methyl vinyl ketone, ethyl acrylate and acrylonitrile) was to charge the stack of Grafoil discs with 5 to 10 coulombs at from $-1.4$ to $-2.0$ volts Ag/Ag I reference electrode. The charged stack was removed from the cell, rinsed and placed in a 10 to 20 percent by volume of monomer solution in dry dimethylformamide. The polymerization was followed by observing the exothermic reaction. For methyl methacrylate and styrene, the graphite was reduced at −2.4 volts and −2.6 volts, respectively, versus the Ag/Ag I reference electrode and the stack of discs were removed from the cell, rinsed and placed into neat monomer. As with the other monomers, polymerization was followed by observing the exotherm produced. Polymer produced was isolated by conventional work-up procedures.

Average molecular weights of polymers made by the process of the invention were determined by osmometry and were as follows: methyl vinyl ketone, $\overline{M}_n=2700$; polyacrylonitrile, $\overline{M}_n=7,700$; methyl methacrylate polymer, $\overline{M}_n=3600$; and polystyrene $\overline{M}_n=2300$.

The following examples indicate the present invention and the manner by which it can be practiced.

EXAMPLE 1

Polymerization of methyl vinyl ketone in solution. Argon was passed through the electrolysis cell before electrolysis was commenced. About 100 mA. current was passed through the cell for 10 minutes at about −1.4 volts ($6.2 \times 10^{-4}$ F) versus the Ag/Ag I reference electrode. At this point the stack of graphite discs was removed from the cell, shaken to remove the bulk of the solvent/electrolyte, rinsed, and the stack of discs placed in a 5 percent by volume solution of methyl vinyl ketone in dry DMF. The exotherm of about 18° C. indicated polymerization.

EXAMPLE 2

Polymerization of acrylonitrile in solution. This run was carried out in a manner similar to Example 1, except −1.9 volts versus the Ag/Ag I reference electrode was used to prepare the reduced graphite for polymerizing a 5% by volume solution of acrylonitrile in DMF. Again the exotherm indicated the formation of polyacrylonitrile.

EXAMPLE 3

Polymerization of acrylonitrile neat. A graphite stack was reduced at −1.8 volts versus Ag/Ag I reference electrode, and when this reduced graphite stack was placed into neat (free from admixture or dilution), deoxygenated acrylonitrile polymerization was initiated.

EXAMPLE 4

Polymerization of methyl methacrylate neat. Two stacks of 20 graphite discs each in dimethyl formamide (DMF)/$(CH_3)_4{}^+ClO_4{}^-$ were subjected to electrolysis at −2.4 volts versus Ag/Ag I reference electrode until five to seven coulombs/stack were passed ($5.2 \times 10^{-5}$ F). The stacks were rinsed with DMF and then placed in deoxygenated, neat methyl methacrylate. After several seconds, an exotherm ($\Delta T_{max} \simeq 3°$ C.) was noted. Excess methyl methacrylate was removed at room temperature by distillation, and 1.2 grams of white polymer was obtained.

EXAMPLE 5

Polymerization of styrene neat. In a similar manner to Example 4, two stacks of 20 graphite discs each were reduced at −2.6 volts versus Ag/Ag I reference electrode until 5 coulombs/stack were passed. The stacks were removed from the cell, rinsed with DMF and were placed into the deoxygenated, freshly distilled, neat styrene. The sytrene turned light green and a 1° C. exotherm was recorded. Removal of the styrene at room temperature by distillation left 150 grams of polymer.

EXAMPLE 6

Polymerization of ethyl acrylate in solution. A 10% by volume solution of ethyl acrylate in dimethyl formamide was made. This experiment was carried out in a manner similar to Example 1. Electrolysis was for 10 minutes at 100 mA, and during polymerization the temperature increased from 25.5° C. to 30.2° C. indicating polymer formation.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications were contemplated which can be made without departing from the spirit of the described invention.

What is claimed is:

1. A process for anionically polymerizing vinyl monomers comprising contacting a vinyl monomer with an electrolytically reduced graphite having formed therein a Graphite$\dot{-}$$R_4N^+$ intercalation compound wherein Graphite$\dot{-}$ is graphite anion radical and each R is alkyl to form vinyl polymer.

2. A process of claim 1 wherein said vinyl monomer comprises methyl vinyl ketone.

3. A process of claim 1 wherein said vinyl monomer comprises acrylonitrile.

4. A process of claim 1 wherein said vinyl monomer comprises methyl methacrylate.

5. A process of claim 1 wherein said vinyl monomer comprises styrene.

6. A process of claim 1 wherein said vinyl monomer comprises ethyl acrylate.

* * * * *